April 17, 1956 C. G. O. MÅNSSON 2,742,568

LEVEL REGULATING MEANS

Filed May 21, 1952 2 Sheets-Sheet 1

INVENTOR
CARL GUSTAF OLOF MÅNSSON
BY Fredrik E. Hans
ATTORNEY

April 17, 1956 C. G. O. MÅNSSON 2,742,568

LEVEL REGULATING MEANS

Filed May 21, 1952 2 Sheets-Sheet 2

INVENTOR
CARL GUSTAF OLOF MÅNSSON
BY Frederick L. Haynes
ATTORNEY

United States Patent Office 2,742,568

Patented Apr. 17, 1956

2,742,568

LEVEL REGULATING MEANS

Carl Gustaf Olof Månsson, Stockholm, Sweden, assignor to Telefonaktiebolaget L M Ericsson, Stockholm, Sweden Application May 21, 1952, Serial No. 289,080

Claims priority, application Sweden May 21, 1951

8 Claims. (Cl. 250—27)

Figure 1:
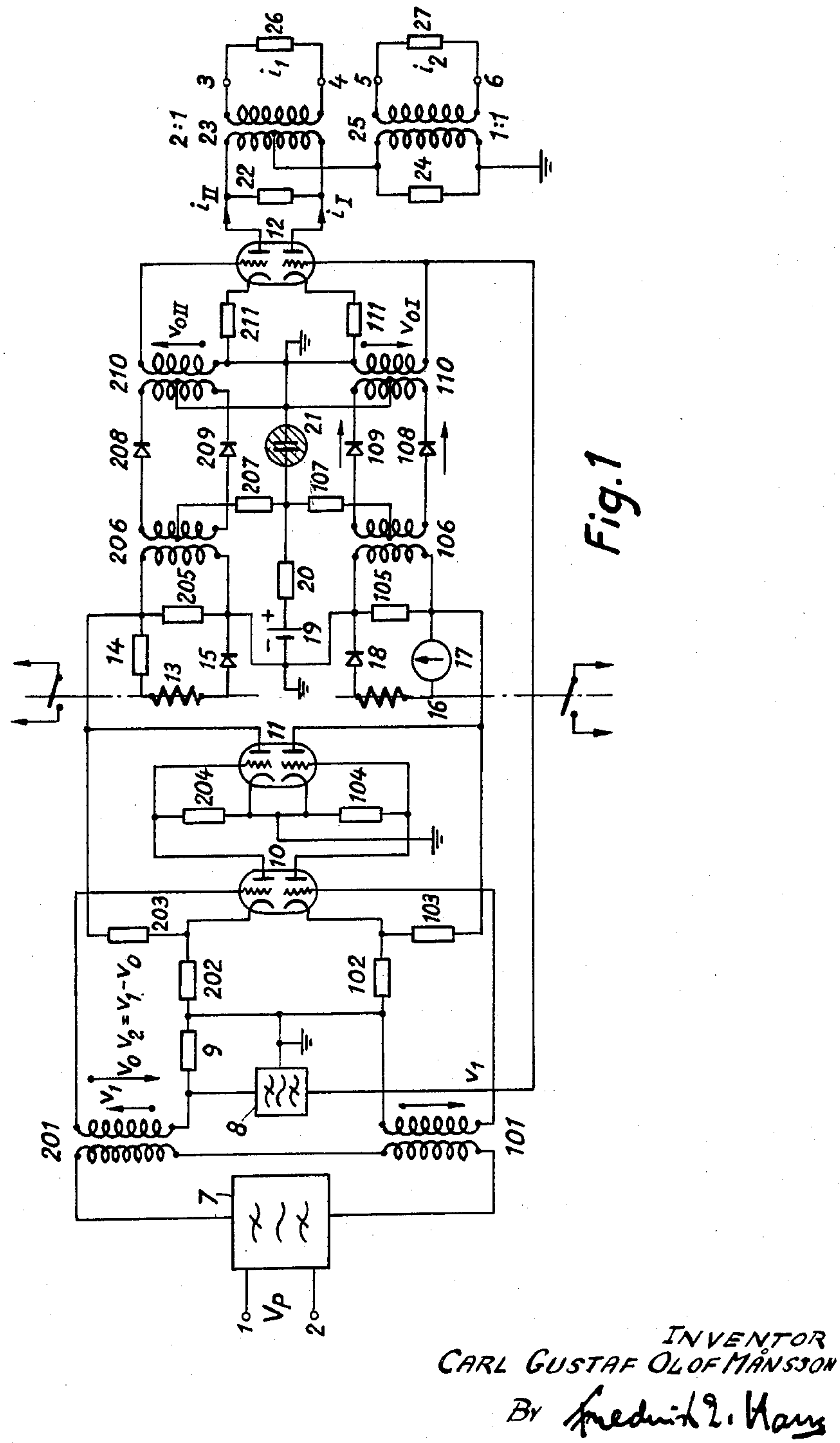

The present invention relates to level regulating means in multichannel carrier frequency transmission systems.

In long distance carrier frequency systems amplifiers have to be inserted at certain interspaces along the line because of the attenuation of the line. Because of the attenuation being different from different frequencies the amplification of these amplifiers has to be made dependent on the frequency. At open wire lines the attenuation of higher frequencies (above 10 kc./s.) will increase about linearly with the frequency, but the attenuation will also vary considerably with the weather, so that when the weather is wet or there is hoar-frost the attenuation curve will rise considerably more steeply. In order to compensate for this, the frequency dependence of the amplification must also be made variable.

The regulation of the amplification of the amplifiers of the equipment will usually be automatically made by the help of two pilot frequencies of a constant output level, one at each side of the transmitted frequency band. One of the pilot frequencies is thereby usually caused to regulate the amplification so that this will be equally changed for all frequencies (so called parallel regulation) while the other pilot frequency is caused to regulate the amplification differently for different frequencies, i. e. it is caused to vary the slope of the amplification response (so called slope regulation). In order that the parallel regulation and the slope regulation may be performed independently of each other, the slope regulation ought to be arranged so, that by a change of the slope the amplification at the pilot frequency, which is to control the parallel regulation, will be mainly unchanged.

In practice the mentioned pilot frequencies for parallel and slope regulation, respectively, are generally made to control impedance networks in dependence of the varying level of said frequencies owing to the attenuation variation within the carrier frequency transmission system, which networks are arranged to regulate the gain of the line amplifiers in such a way that resistances belonging to the impedance networks are varied in dependence of the level of the pilot frequencies. This may be achieved in different ways and i. a. thereby that the pilot frequency actuates a potentiometer with the aid of relays and servomotors, i. e. a mechanical regulation device. The method concurrently utilized, is however, to make the pilot frequency influence the heating of a thermo-sensitive device (thermistor), the resistance of which varies with its temperature.

Devices, previously known, for attenuation control in carrier frequency transmission systems have the disadvantage of the slope regulation network being brought into an extreme position, when faults are arising, which cause the pilot frequency to disappear. In such a case feedback oscillation or overloading may be obtained in the amplifiers. In order to prevent this, special, complicated devices must often be used in the regulation system. The use of thermistors in the regulation device has on the other hand the disadvantage of their cooling taking a longer time than their heating, causing the regulation to be slower in one direction than in the other direction.

This invention intends to remedy these disadvantages by the use of two thermistors in an impedance network for regulation purposes. The temperature of the thermistors and thereby their resistance may be regulated by the help of the pilot frequency by a device with nonlinear components in such a manner that, when the level of the pilot frequency e. g. increases, the resistance of one thermistor will decrease and the resistance of the other thermistor will increase or vice versa. Thereby the slope of the correction curve will be changed and this will occur equally swiftly in one direction as in the other direction depending upon the fact that, when one thermistor is heated, the other will be cooled, and vice versa.

The regulation device may be made so that if the pilot frequency would totally disappear the two thermistors would be caused to get the same resistance. In such a case the correction curve will be caused to have an average slope, which is independent of the absolute value of the resistances of the thermistors.

The pilot frequencies for parallel and slope regulation, respectively, which frequencies are sensitive for the attenuation conditions on the transmission medium and the frequency of which has been chosen in the previously indicated manner, are arranged to actuate, over separate current circuits, individual regulating means for parallel and slope regulation, respectively, included within the amplifier stations (repeaters). Each of said means contain two thermistors, the resistance of which varies in dependence of the level of the pilot frequency.

The present invention relates to a device arranged to convert a pilot voltage to two regulating currents, the one of which is supplied to the first and the other to the second of said thermistors within the device controlled by the pilot voltage in question. The sum of these two currents is constant within the regulation range in question and the currents must further vary in opposite directions against each other within said range, when the incoming pilot voltage is varying. The device (pilot frequency receiver) according to the invention is moreover arranged in such a manner that both said currents become zero when its pilot voltage disappears.

The improvements according to the present invention in regulating means in carrier frequency systems to get two currents varying in dependence of a variable input voltage and in opposite directions is mainly characterized by means for deriving a constant voltage by amplifying and limiting said input voltage, means for deriving and amplifying a voltage equal to the difference between a voltage proportional to the inut voltage and the constant voltage, means for limiting said voltage difference in order to get a voltage being proportional to the difference between the input voltage and said constant voltage within a certain range and having a predetermined maximum value outside this range and means for combining said limited difference voltage with said constant voltage in order to get two currents from these two voltages.

Figure 2:
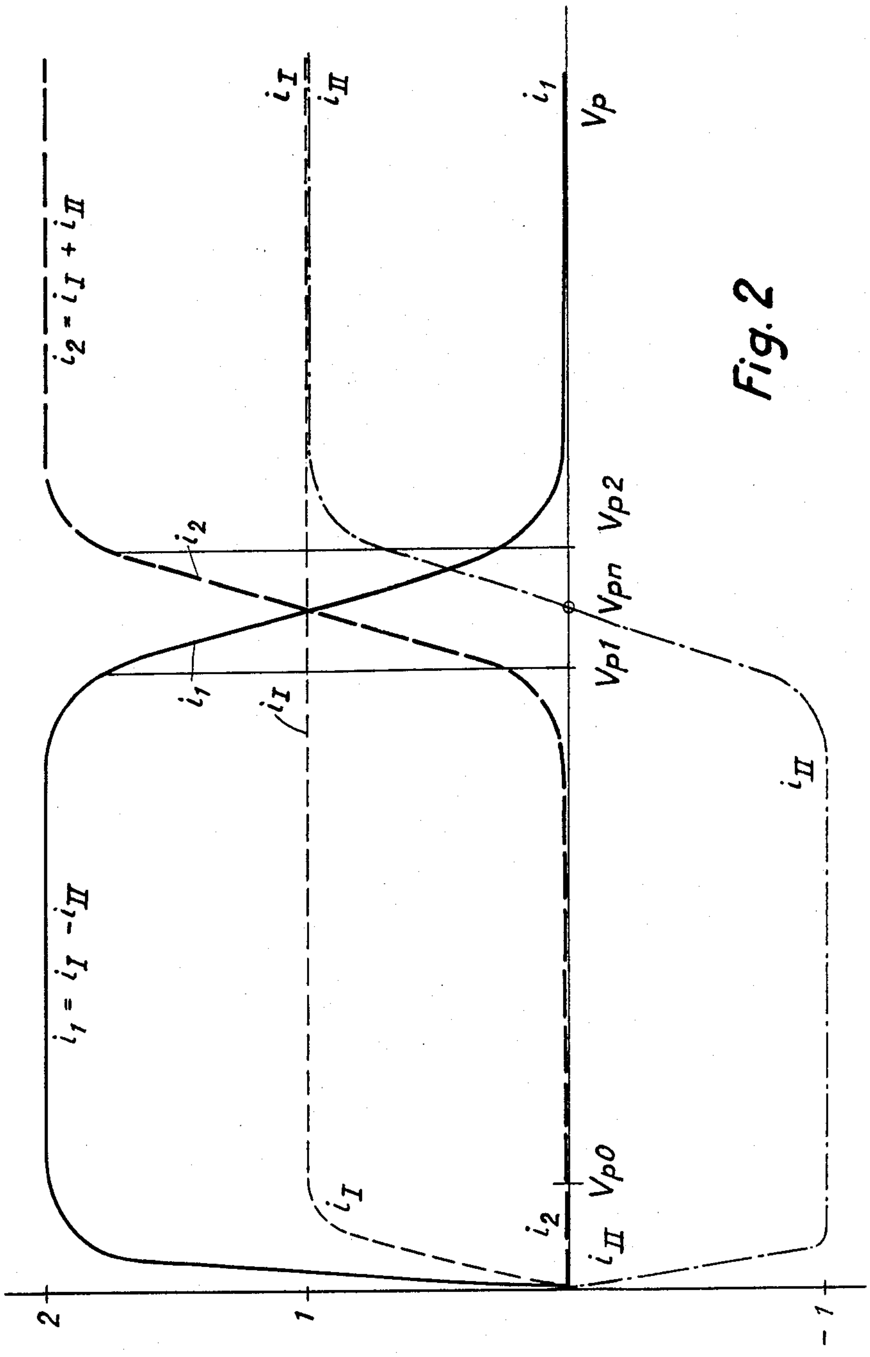

The device according to the invention will be described more in detail in connection with the attached drawings, wherein Fig. 1 shows a connecting diagram and Fig. 2 shows a graph illustrating the variation of the currents during the function of the device.

The arrangement shown in Fig. 1 contains an amplifier part including two mainly equal two-stage amplifiers and an amplitude limiter and an output stage for each amplifier, a common filter arranged in front of the amplifiers and an output circuit including two transformers and common to both amplifiers.

The voltage $V_p$ supplied to the input terminals 1 and 2 of the device passes through a very selective band pass filter 7, wherefrom it arrives to the input transformers 101 and 201 of the two amplifiers. From the secondary side of transformer 101 the voltage is fed to the control grid of the lower half of the twin triode 10. From the anode of said triode the voltage passes via the anode impedance 104 to the grid of the lower half of the twin triode 11 of the second amplifier stage. The two stage amplifier formed by the tubes 10 and 11 and the impedances belonging thereto is voltage feed-back coupled, whereby the feed-back ratio is determined by the ratio between the resistances 103 and 102. The anode circuit of tube 11 includes the anode impedance 105 connected to an amplitude limiter (which includes the transformers 106 and 110 and the rectifiers 108, 109. The amplitude limiter receives its limiting voltage from the battery 19. This voltage is held constant by means of voltage division between a fixed resistance 20 and a glow tube 21 and is supplied to the amplitude limiter via resistance 107. From transformer 110 the voltage is fed to the grid of the lower half of the end-stage-twin-triode 12, which is current feed-back coupled via resistance 111.

The parts described above of the lower amplifier counted from transformer 101 to tube 12 correspond in the upper amplifier to similar parts designated with three-digit-designations in the drawing, viz. parts 201 to 211, inclusive.

The anodes of tube 12 are connected to a transformer device consisting of the transformers 23 and 25 and the impedances 22, 24 shunted therewith which are arranged in such a manner that, when both triode halves work with the same amplitude in push-pull, the whole effect is gained over terminals 3 and 4, and, when they work in parallel the whole effect is gained between the terminals 5 and 6. The secondary circuits of said transformers are loaded by means of resistances 26 and 27, which for the sake of clarity are supposed to be equal.

From the secondary side of transformer 110 a feed-back path is arranged to the secondary side of the input transformer 201 of the upper amplifier, whereby the magnitude of feed-back voltage is determined by the impedances 8 and 9.

The lower amplifier is moreover utilized as a level meter, whereby the current, rectified by rectifier 18, is directly proportional to the level (amplitude) arriving on terminals 1 and 2, which level can be read on the instrument 17. The same current is also passing through the winding of a relay 16, which is utilized for giving alarm if the input level on terminals 1 and 2 fails. A similar relay device, comprising relay 13, rectifier 15 and resistance 14, is inserted in a corresponding position in the upper amplifier.

Briefly the above described device works in the following manner. The incoming A. C. voltage $V_p$ passes the band pass filter 7, which filter only passes a predetermined frequency $f$. The A. C. voltage is divided into two equal parts for the two transformers 101 and 201. The output voltage $v_1$ from the secondary side of transformer 101 is amplified in the above described two-stage-amplifier and is passed over to transformer 106. The voltage, generated by battery 19 and held constant by glow tube 21 provokes in the circuit, containing the secondary winding of transformer 106 and the rectifiers 108, 109, a current, the magnitude of which is mainly determined by the resistance 107. This current is divided into two equal, constant currents through rectifiers 108 and 109, which two currents are both directed towards the central tap of the primary winding of transformer 110, wherefrom they are fed back to battery 19. The voltage transformed to the secondary side of transformer 106 tends to impress an attenuating current upon the circuit containing the rectifiers 109 and 108 in such a way that during a certain (positive) half period this current passes through rectifier 109 in the pass direction thereof, further via the primary winding of transformer 110, through the rectifier 108 in its back direction and the secondary winding of transformer 106. During the half period in question the rectifier 109 has only an unsignificant resistance, since the alternating current flows in its pass direction, and the rectifier 108 has further no greater resistance, as long as the amplitude of the alternating current does not exceed the magnitude of the direct current passing from battery 19 in the pass direction of rectifier 108. If the amplitude of the alternating current becomes greater it has to work against the back resistance of rectifier 108, which is very great, and the alternating current cannot thus practically exceed the threshold value determined by the magnitude of the direct current. During the next (negative) half period the limiting of the alternating current amplitude takes place by means of rectifier 109. The amplitude of the alternating voltage $v_{0_I}$ arising over the secondary of transformer 110 will thus be unable to exceed a certain predetermined maximum value and the arrangement of the device is such that such maximum value is attained already at a relatively small value of the voltage $V_p$. The alternating voltage $v_{0_I}$ is supplied to the grid of tube 12 and provokes in the lower anode circuit of the tube an alternating current $i_I$, the amplitude variation of which as a function of the voltage $V_p$ is indicated by the dashed curve $(i_I)$ in Fig. 2.

The voltage $v_{0_I}$, which after the amplitude limiter is nearly square formed, is fed back from the secondary of transformer 110 via filter 8, which selects the fundamental frequency (the frequency of the input voltage), to the input circuit of tube 10. The useful voltage $v_0$, the magnitude of which is determined by the resistance 9, is of the opposite phase in relation to the voltage $v_1$ over the secondary of transformer 201. The effective voltage fed to the grid of tube 10 is thus determined by the difference between $v_1$ and $v_0$. When the input voltage $V_p$ on terminals 1, 2 is small, the voltage $v_1$ is also small and the grid voltage $v_2=v_1-v_0$ is substantially determined by $v_0$, which latter even when $V_p$ is very small, has reached its maximum value. The voltage $v_2$ becomes thus negative indicating that the voltage of the upper grid of tube 10 is in counterphase to the voltage of the lower grid of the same tube. The upper amplifier containing the same kind of limiter of equally great limiting action as that of the lower one, will when the input voltage $V_p$ is small produce a voltage $v_{0_{II}}$ on the upper grid of tube 12, which last mentioned voltage is equally great but of opposite phase as the voltage $v_{0_I}$ fed to the lower grid. The voltage $v_{0_{II}}$ provokes in the upper anode circuit of tube 12 an alternating current $i_{II}$, the amplitude variation of which is shown in Fig. 2 (the dot-and-dash line, $i_{II}$).

When the input voltage $V_p$ reaches such a value that the voltage $v_1$ is equal to the voltage $v_0$, the alternating voltage on the grid of tube 10 will be zero and consequently the voltage $v_{0_{II}}$ as well as the current $i_{II}$ will be zero.

Upon a further increase in voltage $V_p$ the voltage $v_2$ will be mainly determined by voltage $v_1$. Limiting occurs thereby once more and the voltage $v_{0_{II}}$ attains its maximum value but has now the same phase as voltage $v_{0_I}$. The current $i_{II}$ will then reach its maximum value.

When currents $i_I$ and $i_{II}$ are equally great and directed in opposite directions, the centre top of the primary of transformer 23 will have the potential zero in relation to ground and no current will therefore flow through transformer 25. The whole power is thus obtained over the secondary of transformer 23.

When currents $i_I$ and $i_{II}$ are equal and of the same phase no potential difference occurs between the opposite ends of the primary of transformer 23 and no power is thus transformed to the secondary of transformer 23.

When current $i_{II}$ is equal to zero—presupposing that the turn ratio from half the primary to the secondary of transformer 23 is equal to the turn ratio from whole the primary to the secondary of transformer 25—the power is equally distributed between the two transformers 23 and 25 causing the output currents $i_1$ and $i_2$ in the equal load resistances 26 and 27 to be equally great The amplitudes of the above discussed currents are indicated in Fig. 2 as a function of the input voltage $V_p$. The current $i_I$ obtained in the lower anode circuit of tube 12 is when $V_p$ is very small proportional to this voltage, but approaches soon the maximum magnitude determined by the amplitude limiter when $V_p$ increases, said magnitude thereafter being conserved.

The current $i_{II}$ in the upper anode circuit will, since in the beginning as $V_p$ increases the voltage $v_0$ fed back to tube 10 will increase more rapidly than the secondary voltage $v_1$ derived from $V_p$, increase rapidly to its maximum value determined by the limiter in the upper amplifier in opposite phase against $i_I$. When $v_1$ increases so much that the resulting voltage on the grid of tube 10 will decrease to a value below the limiting voltage for the upper limiter, the current $i_{II}$ will decrease, pass through zero and then increase again but in the same phase as current $i_I$. This increase will proceed until the limiting occurs once more, whereafter the current $i_{II}$ is held constant on its maximum value upon a further increase of voltage $V_p$.

In Fig. 2 the phase relationship between currents $i_I$ and $i_{II}$ is indicated in such a way that the latter current when its phase is opposite against $i_I$ is drawn on the negative part of the graph.

The amplitude of the resulting output currents is built up by the sum of values of currents $i_I$ and $i_{II}$ to the resulting current amplitude curves, shown in Fig. 2. As is apparent from these curves the sum of the two currents $i_1$ and $i_2$ will be constant with increasing $V_p$ when a certain voltage $V_{p0}$ is attained. Upon a certain higher value $V_{pn}$ of said voltage, which value is determined by the maximum value of voltage $v_0$, the currents $i_1$ and $i_2$ will become equally great. Within a limited range having the limits $V_{p1}$ and $V_{p2}$ the currents $i_1$ and $i_2$ will vary straight linearly and in opposite directions in such a manner that an insignificant relative variation of $V_p$ will cause a great relative variation in $i_1$ and $i_2$. It is moreover clear from Fig. 2 and the above mentioned that at the voltage $V_p=0$ both currents $i_1$ and $i_2$ will be zero.

The device according to the invention is further, as mentioned above, provided with indicating means. Thus alarm is obtained from relay 16, when the voltage $V_p$ and thus also the voltage over the primary of transformer 106 disappears. The relay 13 gives alarm, when the voltage over the primary of transformer 206 has reached a certain value corresponding to predetermined variations upwards and downwards from the value $V_{pn}$ in Fig. 2.

I claim:

1. In a carrier frequency transmission system of the class including level regulating means for generating from an input voltage having a variable amplitude two regulating currents varying in opposite direction within a predetermined amplitude range depending upon said input voltage, the combination with first circuit means including a voltage supply proportional to said input voltage and having as output voltage a first auxiliary voltage varying corresponding to variations of said input voltage up to a predetermined amplitude level and remaining constant above said level, second circuit means including a voltage supply proportional to said input voltage and a voltage supply proportional to said first auxiliary voltage and having as output voltage a voltage equal to the difference between said voltage proportional to the input voltage and said first auxiliary voltage, third circuit means limiting the amplitude of said difference voltage so as to generate a second auxiliary voltage having a varying amplitude corresponding to the difference between said voltages proportional to said input voltage and said first auxiliary voltage respectively, the amplitude of said second auxiliary voltage varying up to a predetermined amplitude level and remaining constant above said level, and fourth circuit means connected in an energizing circuit with both said auxiliary voltages so as to generate as output currents two auxiliary currents each proportional to the respective auxiliary voltage, one of said auxiliary output currents being equal to the sum of said two auxiliary currents and the other to the difference between said two auxiliary currents, said sum and difference currents respectively constituting said two regulating currents.

2. A system according to claim 1, wherein the said first circuit means comprise voltage feed back amplifying means fed by said voltage proportional to said input voltage, and amplitude limiting means connected with the output of said amplifying means.

3. A system according to claim 2, wherein the said amplitude limiting means comprise two rectifying means connected to the output circuit of said voltage feed back amplifying means and connected in circuit with a source of direct voltage for feeding the rectifying means with a constant current from said source of voltage, the said rectifying means dividing said constant current into two equal currents one through each rectifying means, for controlling the threshold value of said first auxiliary voltage delivered by said amplitude limiting means.

4. A system according to claim 1, wherein said second circuit means comprise voltage feed back amplifying means directly fed by said voltage proportional to the input voltage and by said voltage proportional to said first auxiliary voltage through a feed back circuit, the said difference voltage being generated in the input circuit of said voltage feed back amplifying means for amplification by said amplifying means.

5. A system according to claim 1, wherein the said third circuit means comprise amplitude limiting means, the input circuit of said limiting means being fed by said difference voltage and the output circuit delivering said second auxiliary voltage.

6. A system according to claim 1, wherein the said fourth circuit means comprise a double triode having one grid connected to said first auxiliary voltage and the other grid connected to said second auxiliary voltage for generating in each of the plate circuits of said triode one of said auxiliary currents, each of said plate currents being proportional to the respective auxiliary voltage, a first transformer having a center tapped primary, said triode plates being connected to the outer ends of said primary for feeding said auxiliary currents to the transformer, and a second transformer having a primary connected with one end to said center tapping and grounded at the other end, the secondary of the first transformer producing the current proportional to the difference between the said two auxiliary currents and the secondary of the second transformer the current proportional to the sum of said two auxiliary currents, said difference and sum currents respectively, constituting said two regulating currents.

7. A system according to claim 1 and further comprising first indicating means responsive to said input voltage for delivering a signal upon disappearance of said input voltage, and second indicating means responsive to said second auxiliary voltage for delivering a signal upon deviation of said latter voltage in either direction by a predetermined value from its mean value corresponding to the mean value of the input voltage.

8. A system according to claim 7 and further comprising level supervising means connected in series with said first indicating means and responsive to the disappearance of said input voltage for measuring the said input voltage.

References Cited in the file of this patent

UNITED STATES PATENTS

| | | |
|---|---|---|
| 1,449,382 | Carson | Mar. 27, 1923 |
| 1,956,582 | Marshall | May 1, 1934 |
| 2,059,594 | Massa | Nov. 3, 1936 |
| 2,298,657 | Smith et al. | Oct. 13, 1942 |
| 2,308,752 | Hadfield | Jan. 19, 1943 |
| 2,357,405 | Katzin | Sept. 5, 1944 |
| 2,423,263 | Sprague | July 1, 1947 |
| 2,507,695 | Dean | May 16, 1950 |
| 2,523,401 | Thompson | Sept. 26, 1950 |
| 2,542,160 | Stoner et al. | Feb. 20, 1951 |
| 2,560,709 | Woodward | July 17, 1951 |